(12) United States Patent
Yang

(10) Patent No.: US 11,068,655 B2
(45) Date of Patent: Jul. 20, 2021

(54) TEXT RECOGNITION BASED ON TRAINING OF MODELS AT A PLURALITY OF TRAINING NODES

(71) Applicant: TENCENT TECHNOLOGY (SHENZHEN) COMPANY LIMITED, Shenzhen (CN)

(72) Inventor: Zhao Yang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 109 days.

(21) Appl. No.: 16/206,537

(22) Filed: Nov. 30, 2018

(65) Prior Publication Data
US 2019/0095423 A1 Mar. 28, 2019

Related U.S. Application Data

(63) Continuation of application No. PCT/CN2017/102759, filed on Sep. 21, 2017.

(30) Foreign Application Priority Data

Sep. 29, 2016 (CN) .......................... 201610864799.8

(51) Int. Cl.
*G06F 40/279* (2020.01)
*G06F 40/289* (2020.01)
(Continued)

(52) U.S. Cl.
CPC ......... *G06F 40/289* (2020.01); *G06K 9/6259* (2013.01); *G06K 9/6262* (2013.01);
(Continued)

(58) Field of Classification Search
CPC ...... G06F 40/10; G06F 40/154; G06F 40/289; G06F 40/49; G06F 40/279; G10L 15/06;
(Continued)

(56) References Cited

U.S. PATENT DOCUMENTS 8,566,095 B2 * 10/2013 Davis .................... G06F 40/284
704/251
8,615,388 B2 12/2013 Li et al.
(Continued)

FOREIGN PATENT DOCUMENTS

CN 103544309 A 1/2014
CN 103617239 A 3/2014
(Continued)

OTHER PUBLICATIONS

Slava Katz, "Estimation of Probabilities from Sparse Data for the Language Model Component of a Speech Recognizer", IEEE Transactions on Acoustics, Speech, and Signal Processing, vol. 35, Issue 3, Mar. 1987, pp. 400 to 401. (Year: 1987).*
(Continued)

*Primary Examiner* — Martin Lerner
(74) *Attorney, Agent, or Firm* — Anova Law Group, PLLC

(57) ABSTRACT

A text recognition method and apparatus, and a storage medium are provided. The method includes: obtaining sample text data, the sample text data comprising a plurality of sample phrases; and generating a recognition model based on the sample phrases by performing training on a plurality of training nodes. Generating the recognition model includes respectively obtaining, by each of the plurality of training nodes, recognition coefficients of the sample phrases distributed to the corresponding training node; and determining, by the plurality of training nodes, model parameters of the recognition model according to the recognition coefficients of the sample phrases. The method also includes obtaining to-be-recognized text data; inputting the text data to the recognition model; and obtaining recognized target text data output by the recognition model and corresponding to the text data.

18 Claims, 3 Drawing Sheets

(51) Int. Cl.
   *G06F 40/49*   (2020.01)
   *G06K 9/62*   (2006.01)
   *G10L 15/183*   (2013.01)
(52) U.S. Cl.
   CPC .......... *G10L 15/183* (2013.01); *G06K 9/6256* (2013.01); *G06K 9/6277* (2013.01)
(58) Field of Classification Search
   CPC ..... G10L 15/063; G10L 15/183; G10L 15/30; G10L 15/146
   USPC ............................ 704/2, 3, 4, 243, 255, 1, 9
   See application file for complete search history.

(56) References Cited

U.S. PATENT DOCUMENTS

| | | | | |
|---|---|---|---|---|
| 8,725,509 | B1* | 5/2014 | Harb | G06F 40/284 704/255 |
| 9,436,681 | B1* | 9/2016 | Tunstall-Pedoe | G06F 40/51 |
| 10,140,983 | B2* | 11/2018 | Kurata | G06F 40/284 |
| 2007/0094169 | A1* | 4/2007 | Yamada | G06F 40/42 706/15 |
| 2010/0246963 | A1* | 9/2010 | Al-Muhtaseb | G06K 9/6297 704/9 |
| 2010/0310172 | A1* | 12/2010 | Natarajan | G06K 9/00865 382/187 |
| 2011/0224971 | A1* | 9/2011 | Moore | G06F 40/211 704/9 |
| 2013/0166285 | A1* | 6/2013 | Chang | G10L 15/32 704/201 |
| 2013/0346059 | A1* | 12/2013 | Brants | G06F 40/45 704/2 |
| 2014/0330552 | A1* | 11/2014 | Bangalore | G06F 40/58 704/4 |
| 2015/0269934 | A1* | 9/2015 | Biadsy | G10L 15/197 704/235 |
| 2015/0371633 | A1* | 12/2015 | Chelba | G10L 15/063 704/240 |
| 2016/0267078 | A1* | 9/2016 | Morehead | G06F 40/30 |
| 2016/0306794 | A1* | 10/2016 | Huang | G06F 40/44 |
| 2017/0083602 | A1* | 3/2017 | Liu | G06F 40/284 |
| 2017/0185895 | A1 | 6/2017 | Chen et al. | |
| 2017/0329648 | A1* | 11/2017 | Ren | H04L 69/40 |
| 2018/0011839 | A1* | 1/2018 | Galle | G06F 40/44 |
| 2018/0075084 | A1* | 3/2018 | Hunicken | G06F 40/211 |

FOREIGN PATENT DOCUMENTS

| | | |
|---|---|---|
| CN | 104157285 A | 11/2014 |
| CN | 104615589 A | 5/2015 |
| CN | 105808523 A | 7/2016 |
| CN | 105894087 A | 8/2016 |

OTHER PUBLICATIONS

The World Intellectual Property Organization (WIPO) International Search Report for PCT/CN2017/102759 dated Dec. 1, 2017 6 Pages (including translation).
A.Stolcke, "SRILM—An Extensible Language Modeling Toolkit", in Proc. Intl. Conf. Spoken Language Processing, Denver, Colorado, Sep. 2002. 4 pages.
D. Jurafsky, "Language Modeling", Lecture 11 of his course on "Speech Recognition and Synthesis" at Stanford. 88 pages.
J. Goodman, "The State of The Art in Language Modeling", presented at the 6th Conference of the Association for Machine Translation in the Americas (AMTA), Tiburon, CA, Oct. 2002. 46 pages.
K. Kirchhoff et al., "Factored Language Models Tutorial", Tech. Report UWEETR-2007-0003, Dept. of EE, U. Washington, Jun. 2007. 39 pages.
S. F. Chen et al., "An Empirical Study of Smoothing Techniques for Language Modeling", Tech. Report TR-10-98, Computer Science Group, Harvard U., Cambridge, MA, Aug. 1998. 63 pages.
The State Intellectual Property Office of the People's Republic of China (SIPO) Office Action 1 for 201610864799.8 dated Jul. 22, 2019 8 Pages (including translation).

\* cited by examiner

TEXT RECOGNITION BASED ON TRAINING OF MODELS AT A PLURALITY OF TRAINING NODES

RELATED APPLICATION

This application is a continuation application of PCT Patent Application No. PCT/CN2017/102759, filed on Sep. 21, 2017, which claims priority to Chinese Patent Application No. 2016108647998, entitled "TEXT RECOGNITION METHOD AND APPARATUS" filed with the Chinese Patent Office on Sep. 29, 2016, the entire contents of all of which are incorporated herein by reference.

FIELD OF THE TECHNOLOGY

This application relates to the field of computers, and specifically, to a text recognition method and apparatus, and a storage medium.

BACKGROUND OF THE DISCLOSURE

Today, the rapid development of the Internet makes it possible to obtain massive text data. For example, currently, text recognition technologies for a voice text or a character text are used in many scenarios. In addition, during text recognition, to obtain higher recognition accuracy, model orders of many recognition models have reached a fourth order, a fifth order or even higher, and a quantity of generated text data is also increasing constantly. During related text recognition, a commonly used training model for recognizing a text is generated by using a model training tool on a stand-alone single computer.

However, as a quantity of data increases, more memory resources are consumed by performing recognition. If a single-machine model training tool is continually used to generate a model for recognizing a text, a problem of memory overflow and training interruption is caused by limited operation resources and memory resources. This affects accuracy of a generated model. Further, accuracy of text recognition is greatly affected when the text recognition is performed by using the foregoing generated model.

For the foregoing problem, no effective solution has been provided.

SUMMARY

Embodiments of this application provide a text recognition method and apparatus, and a storage medium, to at least resolve a technical problem that accuracy of text recognition cannot be ensured by using a related text recognition technology.

According to one aspect of the embodiments of this application, a text recognition method is provided. The method includes: obtaining sample text data which includes a plurality of sample phrases; and generating a recognition model based on the sample phrases by performing training on a plurality of training nodes. Generating the recognition model includes respectively obtaining, by each of the plurality of training nodes, recognition coefficients of the sample phrases distributed to the corresponding training node; and determining, by the plurality of training nodes, model parameters of the recognition model according to the recognition coefficients of the sample phrases. The method also includes obtaining to-be-recognized text data; inputting the text data to a the recognition model; and obtaining recognized target text data output by the recognition model and corresponding to the text data.

According to another aspect of the embodiments of this application, a text recognition apparatus is further provided, including one or more memories and one or more processors. The one or more processors are configured to: obtain sample text data which includes a plurality of sample phrases; and generate a recognition model based on the sample phrases by performing training on a plurality of training nodes. Generating the recognition model includes respectively obtaining, by each of the plurality of training nodes, recognition coefficients of the sample phrases distributed to the corresponding training node; and determining, by the plurality of training nodes, model parameters of the recognition model according to the recognition coefficients of the sample phrases. The one or more processors are also configured to obtain to-be-recognized text data; input the text data to a the recognition model; and obtain recognized target text data output by the recognition model and corresponding to the text data.

According to still another aspect of the embodiments of this application, a non-transitory storage medium storing computer programs is further provided. The computer programs are executable by one or more processors to perform: obtaining sample text data which includes a plurality of sample phrases; and generating a recognition model based on the sample phrases by performing training on a plurality of training nodes. Generating the recognition model includes respectively obtaining, by each of the plurality of training nodes, recognition coefficients of the sample phrases distributed to the corresponding training node; and determining, by the plurality of training nodes, model parameters of the recognition model according to the recognition coefficients of the sample phrases. The computer programs further cause the one or more processors to perform: obtaining to-be-recognized text data; inputting the text data to a the recognition model; and obtaining recognized target text data output by the recognition model and corresponding to the text data.

According to the embodiments of this application, obtained to-be-recognized text data is input to a recognition model, the recognition model being generated according to model parameters respectively obtained by a plurality of training nodes by performing training, each training node being used for obtaining a model parameter according to an obtained recognition coefficient of a sample phrase, to obtain recognized target text data output by the recognition model and corresponding to the text data. That is, according to the recognition model used for recognizing the to-be-recognized text data to obtain the target text data, a training process is distributed to each training node for performing, and the samples used for training are no longer concentrated on limited resource devices. In this way, a problem of memory overflow and training interruption caused by limited operation resources and memory resources in a related model training process is avoided. This reduces memory load and improves model training accuracy. Further, accuracy of text recognition is improved by using the foregoing the recognition model to perform the text recognition.

BRIEF DESCRIPTION OF THE DRAWINGS

The accompanying drawings described herein are used to provide a further understanding of this application, and form part of this application. Exemplary embodiments of this application and descriptions thereof are used to explain this application, and do not constitute any inappropriate limitation to this application. In the figures.

DESCRIPTION OF EMBODIMENTS

To make a person in the art understand the solutions in this application better, the following clearly and completely describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

It should be noted that, in the specification, claims, and accompanying drawings of this application, the terms "first", "second", and the like are intended to distinguish between similar objects instead of describe a specific order or sequence. It should be understood that the data termed in such a way is interchangeable in proper circumstances so that the embodiments of this application described herein can be implemented in orders other than the order illustrated or described herein. Moreover, the terms "include", "contain" and any other variants mean to cover the non-exclusive inclusion. For example, a process, method, system, product, or device that includes a list of steps or units is not necessarily limited to those steps or units expressly listed, but may include other steps or units not expressly listed or inherent to such a process, method, product, or device.

According to one aspect of the embodiments of this application, an embodiment of the foregoing text recognition method is provided. In an optional implementation, the text recognition method may be applied but is not limited to an application environment shown in FIG. 1. To-be-recognized text data is obtained from a terminal 102 by using a network 104, and the text data is input to a recognition model located in a server 106. The recognition model is generated according to model parameters respectively obtained by a plurality of training nodes (for example, a server 108-1, a server 108-2 to a server 108-$n$ shown in the figure) by performing training. The plurality of training nodes may perform training independently in parallel. Each training node is used for obtaining a model parameter according to an obtained recognition coefficient of a sample phrase, and the recognition coefficient is obtained by the training node by training the sample phrase. A sample phrase may be a text phrase in a training data. Then, target text data corresponding to the to-be-recognized text data is recognized by the recognition model.

Figure 1:
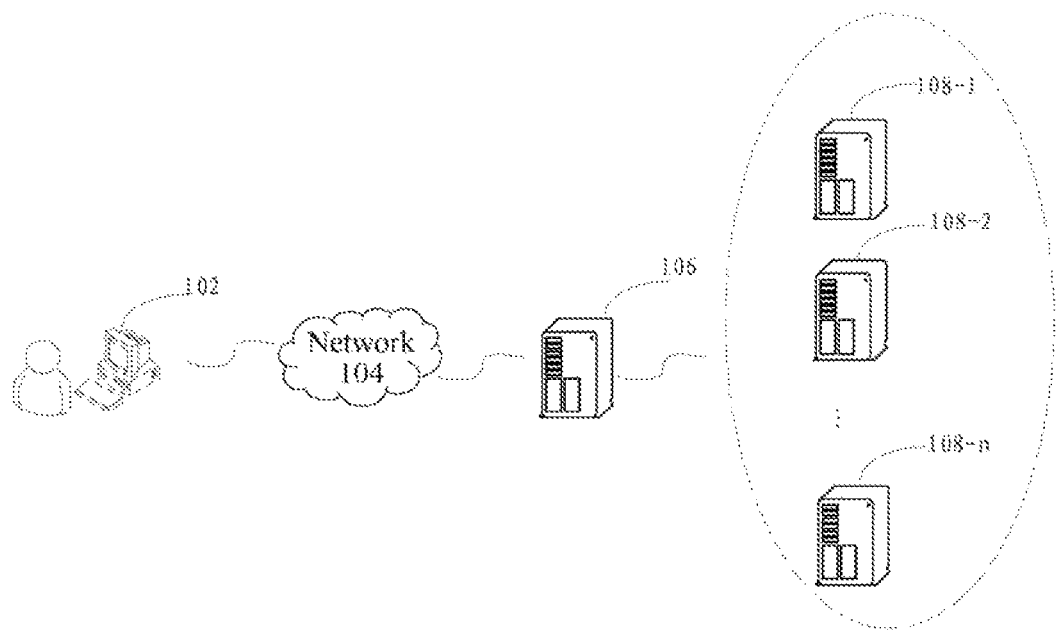
FIG. 1 is a schematic diagram of an application environment of an optional text recognition method according to an embodiment of this application.

It should be noted that, in one embodiment, the server for obtaining the foregoing recognition model by performing training may be an independent processing server (not shown in the figure), or may be a server associated with the plurality of training nodes shown in FIG. 1. For example, the server may be applied to a Hadoop distributed system. This is not limited in this embodiment.

In one embodiment, according to the foregoing text recognition method, obtained to-be-recognized text data is input to a recognition model, the recognition model being generated according to model parameters respectively obtained by a plurality of training nodes by performing training, each training node being used for obtaining a model parameter according to an obtained recognition coefficient of a sample phrase, to obtain recognized target text data output by the recognition model and corresponding to the text data. According to the recognition model, a training process is distributed to each training node for performing, and the samples used for training are no longer concentrated on limited resource devices. In this way, a problem of memory overflow and training interruption caused by limited operation resources and memory resources in a related model training process is avoided. This reduces memory load and improves model training accuracy. Further, accuracy of text recognition is improved by using the foregoing recognition model to perform the text recognition.

Optionally, in one embodiment, the terminal may include but is not limited to at least one of the following: a mobile phone, a tablet computer, a notebook computer, a desktop personal computer (PC), a digital television, and other hardware devices for obtaining the to-be-recognized text data. The foregoing network may include but is not limited to at least one of the following: a wide area network, a metropolitan area network, or a local area network. The foregoing is merely exemplary, and no limitation is set in this embodiment.

Figure 2:
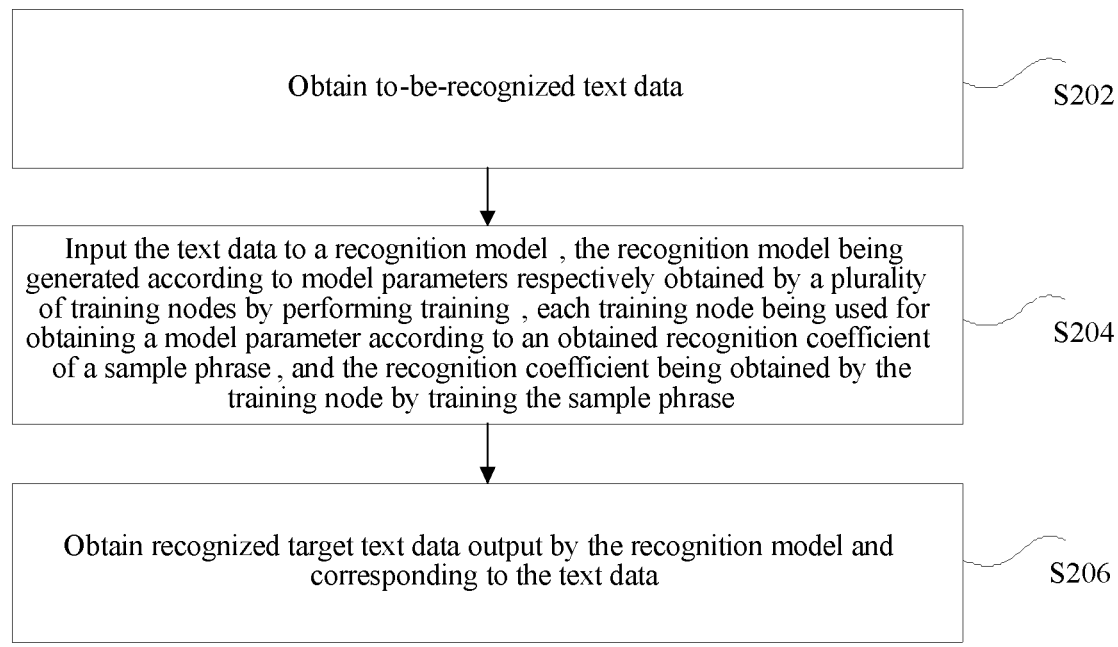
FIG. 2 is a flowchart of an optional text recognition method according to an embodiment of this application.

According to an embodiment of this application, a text recognition method is provided. As shown in FIG. 2, the method includes:

S202: Obtain to-be-recognized text data.

S204: Input the text data to a recognition model, the recognition model being generated according to model parameters respectively obtained by a plurality of training nodes by performing training, each training node being used for obtaining a model parameter according to an obtained recognition coefficient of a sample phrase, and the recognition coefficient being obtained by the training node by training the sample phrase.

S206: Obtain recognized target text data output by the recognition model and corresponding to the text data.

Optionally, in one embodiment, the text recognition method may be applied but is not limited to a recognition process of a voice text and a character text, for example, applied to a process in which collected voices are recognized to characters, or applied to a process in which an obtained character text is precisely recognized. The foregoing is merely exemplary, and an application scenario is not limited in this embodiment.

It should be noted that, obtained to-be-recognized text data is input to a recognition model, the recognition model being generated according to model parameters respectively obtained by a plurality of training nodes by performing training, each training node being used for obtaining a model parameter according to an obtained recognition coefficient of a sample phrase, to obtain recognized target text data output by the recognition model and corresponding to the text data. That is, according to the recognition model used for recognizing the to-be-recognized text data to obtain the target text data, a training process is distributed to each training node for performing, and the samples used for training are no longer concentrated on limited resource devices. In this way, a problem of memory overflow and training interruption caused by limited operation resources and memory resources in a related model training process is avoided. This reduces memory load and improves model training accuracy. Further, accuracy of text recognition is improved by using the foregoing recognition model to perform the text recognition.

Optionally, in one embodiment, before the obtaining to-be-recognized text data, the method may include but is not limited to training obtained sample text data, to generate the recognition model. In one embodiment, the sample text data includes a plurality of sample phrases. The sample phrases may be obtained by performing text segmentation. The plurality of training nodes may be but is not limited to nodes in a Hadoop distributed system. Each training node performs training to obtain the model parameters for generating the recognition model.

Optionally, in one embodiment, each sample phrase may include but is not limited to one or more words. Each word is a phrase having an independent meaning. For example, a sample phrase on which word segmentation is performed is "<s> we go to play ball </s>". The sample phrase includes five words: "<s>", "we", "go to", "play ball", and "</s>", <s> being a start identifier, and </s> being an end identifier.

It should be noted that, the sample text data in some embodiments may be but is not limited to N-Gram data obtained by performing a round of MapReduce operation (a first round of MapReduce operation) on original sample data (for example, collected original corpuses). A MapReduce operation, as used herein, may include splitting to-be-processed data into a plurality of independent chunks which are processed in a parallel manner. Here, the first round of MapReduce operation may include dividing the original corpuses to multiple chunks (e.g., n chunks), and assigning multiple training nodes (e.g., server 108-1 to 108-*n*) with the multiple chunks (e.g., each server is assigned with one of the n chunks) for processing, so that word segmentation of different chunks of the original corpuses can be performed in parallel. The N-Gram data includes a plurality of sample phrases on which word segmentation is performed. The example of "we go to play ball" is further used. The N-Gram data on which word segmentation is performed (the sample text data including a plurality of sample phrases) includes: "<s>", "<s> we", "<s> we go to", "<s> we go to play ball", "we", "we go to", "we go to play ball", "we go to play ball </s>", "go to", "go to play ball", "go to play ball </s>", "play ball", "play ball </s>", and "</s>". In some embodiments, after performing the word segmentation, each training node may send the corresponding sample phrases to the server 106 where all sample phrases from the multiple training nodes are combined and the sample text data (e.g., N-gram data) are generated. In some embodiments, the server 106 may send the sample text data to the multiple training nodes for further processing.

In addition, in one embodiment, according to a quantity of words, the sample phrases in the sample text data may be divided according to orders. Each order is used for indicating a quantity of words in one sample phrase. The example of "we go to play ball" is further used. The corresponding N-Gram data includes first-order sample phrases: "<s>", "we", "go to", "play ball", and "</s>"; second-order sample phrases: "<s> we", "we go to", "go to play ball", and "play ball </s>"; third-order sample phrases: "<s> we go to", "we go to play ball", and "go to play ball </s>"; fourth-order sample phrases: "<s> we go to play ball" and "we go to play ball </s>".

Optionally, in one embodiment, another round of MapReduce operation (a second round of MapReduce operation) is performed on the sample text data, to obtain a word frequency r and a syntax coefficient $d_r$ of each sample phrase in the sample text data. For example, the second round of MapReduce operation may include dividing the sample phrases into multiple groups and determining, by multiple training nodes, word frequencies and syntax coefficients of the multiple groups of the sample phrases in the sample text data in parallel (e.g., each server 108-I is configured to obtain the word frequencies and syntax coefficients of sample phrases in one of the multiple groups). The syntax coefficient $d_r$ is used for obtaining a recognition coefficient and a syntax probability corresponding to the sample phrase according to the word frequency r. In some embodiments, the syntax coefficient $d_r$ is the amount of discounting found by Good-Turing estimation.

Optionally, in one embodiment, the model parameter may be obtained according to but is not limited to a recognition coefficient of a sample phrase obtained by each training node. The recognition coefficient may include but is not limited to a syntax probability and a back-off coefficient of the sample phrase. It should be noted that, in one embodiment, the syntax probability may be obtained according to but is not limited to a sample probability by which the sample phrase appears on a corresponding training node and/or the syntax coefficient.

Optionally, in one embodiment, the generating the recognition model by using the sample phrases includes: distributing the sample phrases in the sample text data to the plurality of training nodes according to a predecessor word of each sample phrase, the predecessor word of the sample phrase being a previous word of a current word in the sample phrase, the current word being a last word in the sample phrase, and each word being a phrase having an independent meaning; obtaining the model parameters respectively obtained by the plurality of training nodes by training the received sample phrases; and combining the model parameters to generate the recognition model.

That is, the sample phrases in the sample text data (that is, the N-Gram data) are distributed to the plurality of training nodes with reference to the predecessor words of the sample phrases (e.g., the sample phrases are divided into multiple groups based on the predecessor words, and each training node receives one group of sample phrases for further training; for example, a sample phrase whose predecessor word belongs to a first word pool is distributed to a first training node, a sample phrase whose predecessor word belongs to a second word pool is distributed to a second training node), so that the sample phrases respectively received by the plurality of training nodes are respectively trained by the plurality of training nodes, to obtain the model parameters for generating the recognition model (a third round of MapReduce operation). It should be noted that, in one embodiment, the sample phrases obtained by each training node may include but are not limited to sample phrases belonging to different orders.

For example, using a training node B as an example, "we" is used as an example of a corresponding predecessor word. Sample phrase whose predecessor words are "we" in the sample text data (that is, the N-Gram data) are distributed to the training node B. For example, the example of "we go to play ball" is further used. Sample data obtained by the training node B includes: "we go to" and "<s> we go to".

The training node B may but is not limited to training the received sample phrases according to orders, to obtain a recognition coefficient corresponding to each sample phrase. In this way, model parameters of the training node B are obtained according to the recognition coefficients of the sample phrases belonging to different orders on the training node B.

When training the sample phrases belonging to different orders, the training node may perform training by but is not limited to by means of data smoothing. It should be noted that, data smoothing is used for resolving a problem of data sparseness that is caused due to that many proper collocation relationships between words do not occur in the sample text data, also referred to as a problem of zero probability. On one hand, this manner can ensure that none of probabilities in the recognition model is zero. On the other hand, this manner enables probabilities of the recognition model parameters to be more evenly distributed, that is, a low probability (including a zero probability) is lifted up, and a high probability is lowered down. There are many types of data smoothing algorithms herein, including Good-Turing smoothing, Katz smoothing, Back-off smoothing, linear interpolation smoothing, Witten-Bell smoothing, and the like. In one embodiment, the Katz algorithm is used as an example for description, and details are not described again below.

That is, each training node trains the obtained sample phrases by means of data smoothing, to obtain the recognition coefficients of each sample phrase: the syntax probability and the back-off coefficient, and further obtains the model parameters of the training node by using the recognition coefficients of each the sample phrase, so that the recognition model used in a text recognition process is generated by combining the model parameters of each training node.

In embodiments provided in this application, according to the recognition model used for recognizing the to-be-recognized text data to obtain the target text data, a training process is distributed to each training node for performing, and the samples used for training are no longer concentrated on limited resource devices. In this way, a problem of memory overflow and training interruption caused by limited operation resources and memory resources in a related model training process is avoided. This reduces memory load and improves model training accuracy. Further, accuracy of text recognition is improved by using the foregoing recognition model to perform the text recognition.

In an optional solution, the generating the recognition model by using the sample phrases includes:

S1: Distribute the sample phrases in the sample text data to the plurality of training nodes according to a predecessor word of each sample phrase, the predecessor word of the sample phrase being a previous word of a current word in the sample phrase, and each word being a phrase having an independent meaning.

S2: Obtain the model parameters respectively obtained by the plurality of training nodes by training the received sample phrases.

S3: Combine the model parameters to generate the recognition model.

It should be noted that, in one embodiment, the distributing the sample phrases in the sample text data to the plurality of training nodes may include but is not limited to performing the distribution according to orders. This includes:

1) respectively distributing sample phrases whose orders are a first order in the sample text data to the plurality of training nodes (e.g., each training node is distributed with all sample phrases formed by one word); and 2) respectively distributing sample phrases whose orders are greater than or equal to a second order in the sample text data to the plurality of training nodes according to predecessor words of the sample phrases (e.g., each training node is assigned with one or more predecessor words, and is distributed with some of the sample phrases formed by two or more words according to the predecessor words of the sample phrases).

That is, the sample phrases whose orders are a first order are respectively distributed to the training nodes. Because calculation amount of the first-order sample phrases is not large, training efficiency on each training node is not substantially affected. For example, there is no need to divide the sample phrases into different groups or process the different groups at different training nodes when calculating first-order probabilities/parameters, all first-order information may be obtained independently on a server. When calculating probabilities/parameters at higher order(s), the sample phrases are divided into multiple groups based on certain rule and the multiple groups are processed on different training node in parallel. In addition, the sample phrases whose orders are greater than or equal to a second order are respectively distributed to different training nodes according to predecessor words. The training nodes respectively receive the sample phrases distributed with reference to a predecessor word. The sample phrases include sample phrases belonging to different orders. The predecessor words of the sample phrases are used as a reference for distribution herein. This ensures that each training node includes all statistics required for all training.

Optionally, in one embodiment, when distributing the sample phrases in the sample text data to the plurality of training nodes, syntax coefficients corresponding to the sample phrases are distributed to a corresponding training node. Each syntax coefficient (also referred to as a discount rate, where details are not described again below) in one embodiment is used for obtaining a syntax probability (also referred to as a smoothing probability) corresponding to each sample phrase in the recognition coefficients. It should be noted that, the syntax coefficient herein and the sample phrase may be synchronously sent to the corresponding training node, or may be asynchronously sent. Different distribution manners may be applied according to different scenario requirements. This is not limited in this embodiment. In addition, the syntax coefficient herein may be but is not limited to being obtained according to the word frequency of the sample phrase before being distributed and after the second round of MapReduce operation is performed.

Optionally, in one embodiment, after receiving the distributed sample phrase and the corresponding syntax coefficient, each training node performs corresponding data training (e.g., data smoothing processing and training). The data training process herein may be but is not limited to being performed by using a prefix tree (for example, a Trie tree). Using an example in which the text recognition method is applied to a Hadoop system, a sample probability by which each sample phrase on the training node appears on the training node is obtained by using a data structure of a Trie tree. The data structure of the Trie tree may include but is not limited to each tree node in the Trie tree.

Figure 3:
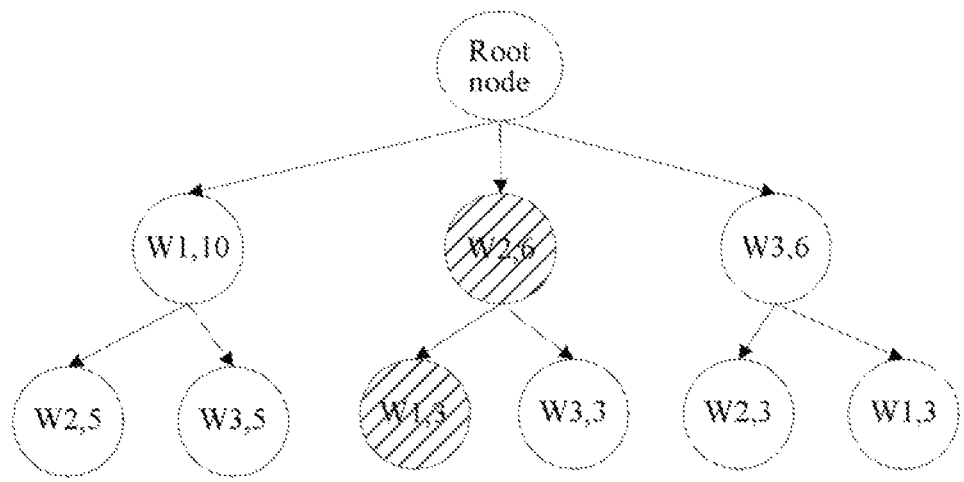
FIG. 3 is a schematic diagram of a Trie tree in an optional text recognition method according to an embodiment of this application.

For example, a Trie tree having a mapping relationship with words in a sample phrase is created according to a sequence of the words. The Trie tree is shown in FIG. 3. Each subnode is used for recording a word and a corresponding word frequency in the sample phrase. A word $w_i$ recorded by a subnode is a word following a word $w_{i-1}$ recorded by a root node adjacent to the subnode in the sample phrase. For example, each word in a sample phrase is searched for according to indication of shadow.

Further, a sample probability of a sample phrase is obtained according to a word frequency of a word recorded by each tree node in the Trie tree. For example, using an example in which the sample phrase is $w_1 w_2 \ldots w_i$, a ratio of a word frequency of the sample phrase whose current word is $w_i$ and that is recorded in the Trie tree to a word frequency of the sample phrase whose current word is $w_{i-1}$ and that is recorded in the Trie tree may be used as a sample probability of the sample phrase $w_1 w_2 \ldots w_i$. The word frequency of the current word $w_{i-1}$ may be but is not limited to being obtained by performing summation on subordinate subnodes of $w_{i-1}$. That is, a word frequency on a neighboring root node (for example, an $(i-1)^{th}$ order) may be determined by using a sum of word frequencies recorded on subnodes (for example, an $i^{th}$ order) in the Trie tree. This ensures accuracy of the obtained sample probability.

Optionally, in one embodiment, the combining the model parameters to generate the recognition model includes: combining, according to orders of the sample phrases, the model parameters obtained by the plurality of training nodes by performing training, to generate the recognition model.

In embodiments provided in this application, by distributing the sample phrases to different training nodes according to the predecessor words of the sample phrases for performing training, training efficiency can be improved, and all statistics required for all training can be ensured to be included on the training nodes. This ensures data independence and integrity.

In an optional solution, when distributing the sample phrases in the sample text data to the plurality of training nodes, the method further includes:

S1: Repeatedly perform the following steps according to orders of the sample phrases in the sample text data till all orders in the sample text data are traversed, each order being used for indicating a quantity of words in one sample phrase, and each order including one or more sample phrases:

S12: Obtain a word frequency of a current sample phrase in a current order which the current sample phrase belongs to; obtain a syntax coefficient corresponding to the current sample phrase according to the word frequency, the syntax coefficient being used for obtaining a syntax probability of the current sample phrase.

S14: Determine whether the current sample phrase is a last sample phrase in the current order.

S16: If the current sample phrase is not the last sample phrase in the current order, obtain a sample phrase following the current sample phrase in the current order to use as the current sample phrase.

S18: If the current sample phrase is the last sample phrase in the current order, obtain an order following the current order to use as the current order (e.g., an order higher than the current order), and obtain a sample phrase in the order following the current order to use as the current sample phrase.

S2: Distribute the syntax coefficient to a corresponding training node in the plurality of training nodes according to the corresponding current sample phrase.

Details are described with reference to the following example. After the N-Gram data, that is, the sample text data is obtained, the second round of MapReduce operation is performed on the N-Gram data according to orders, to obtain a word frequency r and a corresponding syntax coefficient $d_r$ of each sample phrase in the N-Gram data.

For example, In an optional implementation, a calculation formula of the syntax coefficient $d_r$ may be as follows:

$$d_r = \frac{\frac{r^*}{r} - \frac{(k+1)n_{k+1}}{n_1}}{1 - \frac{(k+1)n_{k+1}}{n_1}} \quad (1)$$

$d_r$ is used for representing the syntax coefficient, r is used for representing the word frequency of the sample phrase in the order, $n_i$ is used for representing a quantity of sample phrases whose word frequencies are i times in the order, k is used for representing a predetermined coefficient, and $$r^* = (r+1)\frac{n_{r+1}}{n_r}.$$

That is, the sample phrases in the N-Gram data are traversed to perform the MapReduce operation, thereby obtaining the word frequency and the corresponding syntax coefficient of each sample phrase.

In exemplary embodiments provided in this application, corresponding syntax coefficients are obtained and distributed when the sample phrases in the sample text data are distributed to the plurality of training nodes. This reduces training time and improves training efficiency and generation efficiency of the recognition model. Further, accuracy of the generated recognition model is ensured, thereby improving accuracy of recognizing text data by using the recognition model.

In an optional solution, the obtaining the model parameters respectively obtained by the plurality of training nodes by training the received sample phrases includes: respectively mapping the sample data (e.g., sample phrases) received by each of the plurality of training nodes to a prefix tree corresponding to the training node, the prefix tree being used for indicating a ranking relationship of words in each sample phrase received by the corresponding training node.

Each training node performs the following steps according to a corresponding prefix tree:

S1: Obtain a sample probability of a sample phrase according to the prefix tree, the sample probability being used for indicating a probability by which the sample phrase appears on the training node.

S2: Obtain a syntax probability of the sample phrase according to the sample probability of the sample phrase and/or a syntax coefficient corresponding to the sample phrase.

S3: Obtain a back-off coefficient of the sample phrase according to the syntax probability of the sample phrase, to obtain a model parameter of the training node.

Optionally, in one embodiment, the obtaining a syntax probability of the sample phrase according to the sample probability of the sample phrase and/or a syntax coefficient corresponding to the sample phrase includes:

S1: Repeatedly perform the following steps according to orders of the sample phrases on the training nodes till all orders on the training nodes are traversed.

S12: Obtain a syntax probability of a sample phrase whose order is n according to the following formula:

$$P(w_n | w_1 \ldots w_{n-1}) = \begin{cases} \dfrac{C(w_1 \ldots w_n)}{C(w_1 \ldots w_{n-1})}, & r > k \\ d_r \dfrac{C(w_1 \ldots w_n)}{C(w_1 \ldots w_{n-1})}, & 0 < r \leq k \end{cases} \quad (2)$$

$P(w_n|w_1 \ldots w_{n-1})$ is used for representing a syntax probability of a sample phrase whose first (n−1) words are $w_1 \ldots w_{n-1}$ and a current word is $w_n$ in sample phrases whose orders are n, k is a predetermined parameter, r is used for representing a word frequency of the sample phrase whose first (n−1) words are $w_1 \ldots w_{n-1}$ and a current word is $w_n$ in the order, $d_r$ is used for representing a syntax coefficient corresponding to the sample phrase whose first (n−1) words are $w_1 \ldots w_{n-1}$ and a current word is $w_n$, and $$\dfrac{C(w_1 \ldots w_n)}{C(w_1 \ldots w_{n-1})}$$

is used for representing a sample probability of the sample phrase whose first (n−1) words are $w_1 \ldots w_{n-1}$ and a current word is $w_n$. Optionally, in one embodiment, the obtaining a back-off coefficient of the sample phrase according to the syntax probability of the sample phrase includes:

$$\alpha_{w_1 \ldots w_{n-1}} = \dfrac{1 - \sum_{w_i: c(w_1 \ldots w_{n-1} w_i) > 0} p(w_i | w_1 \ldots w_{n-1})}{1 - \sum_{w_i: c(w_1 \ldots w_{n-1} w_i) > 0} p(w_i | w_2 \ldots w_{n-1})} \quad (3)$$

$\alpha_{w_1 \ldots w_{n-1}}$ is used for representing a back-off coefficient of the sample phrase whose first (n−1) words are $$\sum_{w_1 \ldots w_{n-1}, w_i: c(w_1 \ldots w_{n-1} w_i) > 0} p(w_i | w_1 \ldots w_{n-1})$$

is used for representing obtaining, in the sample phrases whose orders are n, a sum of syntax probabilities of sample phrases whose first (n−1) words are $w_1 \ldots w_{n-1}$ and current words are $w_i$ when word frequencies of the sample phrases whose first (n−1) words are $w_1 \ldots w_{n-1}$ and current words are $w_i$ are greater than 0, $$\sum_{w_i: c(w_1 \ldots w_{n-1} w_i) > 0} p(w_i | w_2 \ldots w_{n-1})$$

is used for representing obtaining, in the sample phrases whose orders are n, a sum of syntax probabilities of sample phrases whose first (n−2) words are $w_2 \ldots w_{n-1}$ and current words are $w_i$ when word frequencies of the sample phrases whose first (n−2) words are $w_2 \ldots w_{n-1}$ and current words are $w_i$ are greater than 0.

In exemplary embodiments provided in this application, when training the recognition model, a training process is distributed to each training node for performing, so that a problem of memory overflow caused by performing training by using a single machine is avoided. This reduces memory load of each training node and ensures accuracy of training performed by each training node, thereby improving training efficiency.

In an optional solution, before the obtaining recognized target text data output by the recognition model and corresponding to the text data, the method further includes:

S1: Obtain, according to the recognition model, a recognition probability corresponding to each text phrase in the to-be-recognized text data, the text data including a plurality of text phrases.

S2: Determine, according to the recognition probability, the target text data output by the recognition model.

Optionally, in one embodiment, the obtaining, according to the recognition model, a recognition probability corresponding to each text phrase in the to-be-recognized text data includes:

$$P(w_m | w_1 \ldots w_{m-1}) = \begin{cases} P_{w_1 \ldots w_m}, & r > 0 \\ \alpha_{w_1 \ldots w_{m-1}} P_{w_2 \ldots w_m}, & r = 0 \end{cases} \quad (4)$$

$P(w_m|w_1 \ldots w_{m-1})$ is used for representing a recognition probability of a text phrase whose first (m−1) words are $w_1 \ldots w_{m-1}$ and a current word is $P(w_n|w_1 \ldots w_{n-1})$ in text phrases whose orders are m in text data, the current word being a last word in the text phrase, each word being a phrase having an independent meaning, and each order being used for indicating a quantity of words included in one text phrase, r is used for representing a word frequency of the text phrase whose first (m−1) words are $w_1 \ldots w_{m-1}$ and a current word is $w_m$ in the order, $P_{w_1 \ldots w_m}$ is used for representing a text probability of the text phrase whose first (m−1) words are $w_1 \ldots w_{m-1}$ and a current word is $w_m$, $\alpha_{w_1 \ldots w_{m-1}}$ is used for representing a back-off coefficient of the text phrase whose first (m−1) words are $w_1 \ldots w_{m-1}$, and $P_{w_2 \ldots w_m}$ is used for representing a text probability of a text phrase whose first (m−2) words are $w_2 \ldots w_{m-1}$ and a current word is $w_m$.

In some embodiments, when smoothing operation is incorporated in the training process, e.g., when the back-off coefficients needs to be calculated, taking a 4-gram phrase $w_1, w_2, w_3, w_4$ as an example, information about $w_1, w_2, w_3$ and $w_1, w_2, w_3, w_4$ (e.g., syntax coefficient) are needed to calculate conditional probability $P(w_4|w_1 w_2 w_3)$ and information about $w_1, w_2, w_3, w_4$ and $w_2, w_3, w_4$ are needed to calculate bag-of-words model bow $(w_1 w_2 w_3)$. If $w_1$ is used as a basis for dividing/distributing the sample phrases, the training node may not have information about $w_2, w_3, w_4$ to determine the back-off coefficients. If $w_3$ is used as the basis for dividing/distributing the sample phrases, i.e., using the predecessor word of the current word (which is the last word of the sample phrase), all statistical information (e.g., parameters/coefficients) for training sample phrases distributed to one training node are ensured to be found in the same training node. That is, each training node can perform training integrally and independently. Different groups of sample phrases can be trained individually at the corresponding training node to obtain corresponding model parameters. The final recognition language model can be generated by integrating model parameters from the plurality of training nodes.

Optionally, in one embodiment, the determining, according to the recognition probability, the target text data output by the recognition model includes: when the recognition probability is greater than a predetermined threshold, using a recognized phrase indicated by the recognition probability as a target phrase in the target text data.

Optionally, in one embodiment, the predetermined threshold may be set but is not limited to different values according to different scenarios. This is not limited in this embodiment.

In some embodiments, multiple MapReduce operations are performed during the training process. For example, a MapReduce operation can be performed on the original corpuses (e.g., word filtering and word segmentation) to obtain N-Gram data. Another MapReduce operation can be performed on the N-gram data to collect smoothing coefficients at different orders and first-order syntax probabilities. When dividing the N-gram data based on certain rules, and distributing the divided data to multiple training nodes, the corresponding smoothing coefficients and first order syntax probabilities are distributed to the multiple training nodes together with the divided N-gram data, and another MapReduce operation can be performed at the training nodes to estimate model parameters. Additional MapReduce operation can be performed on the model parameters to rally and regulate the estimated model parameters based on orders. Further, model parameters at different orders can be combined and integrated to output a trained language model (e.g., ARPA format).

In one example, 30 Gigabytes of original corpuses were used as training data to generate a language model by respectively applying a stand-alone SRILM (SRI Language Modeling Toolkit) and a Hadoop distributed system built on 20 regular servers. Experiment results showed that the language model obtained by applying the SRILM and the language model obtained by applying the disclosed method in a Hadoop distributed system have almost the same PPL value (perplexity) and speech recognition performance. The training time is decreased from 6 hours in the stand-alone application and 2.5 hours in the Hadoop system. As the performance of the cluster increases, the training time can be further shortened.

In exemplary embodiments provided in this application, a recognition probability corresponding to each text phrase in the to-be-recognized text data is obtained according to the recognition model obtained through the foregoing training process. Further, when the recognition probability is greater than a predetermined threshold, a recognized phrase indicated by the recognition probability is used as a target phrase corresponding to the text phrase in the target text data.

It should be noted that, for ease of description, the foregoing method embodiments are described as a series of action combination. But a person skilled in the art should know that this application is not limited to any described sequence of action, as some steps can adopt other sequences or can be performed simultaneously according to this application. Secondarily, a person skilled in the art should know that the embodiments described in the specification all belong to optional embodiments and the actions and modules are not necessary for this application.

By means of description of the foregoing implementation, a person skilled in the art may clearly learn that the method in the foregoing embodiment may be implemented by relying on software and a necessary common hardware platform or by using hardware, but the former one is a preferred implementation in many cases. Based on such an understanding, the technical solutions of this application essentially or the part contributing to a related technology may be implemented in a form of a software product. The computer software product is stored in a storage medium (such as an ROM (read-only memory)/RAM (random access memory), a magnetic disk, or an optical disc), and includes several instructions for instructing a terminal device (which may be a mobile phone, a computer, a server, a network device, and the like) to perform the method described in the embodiment of this application.

Figure 4:
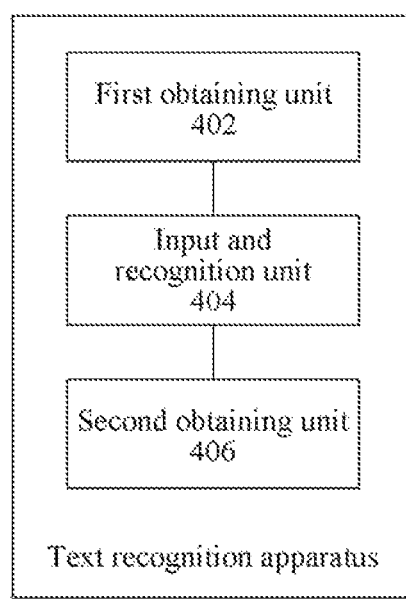
FIG. 4 is a schematic diagram of an optional text recognition apparatus according to an embodiment of this application.

According to another aspect of the embodiments of this application, a text recognition apparatus for performing the foregoing text recognition method is further provided. As shown in FIG. 4, the apparatus includes:

1) a first obtaining unit 402, configured to obtain to-be-recognized text data;

2) an input and recognition unit 404, configured to input the text data to a recognition model, the recognition model being generated according to model parameters respectively obtained by a plurality of training nodes by performing training, each training node being used for obtaining a model parameter according to an obtained recognition coefficient of a sample phrase, and the recognition coefficient being obtained by the training node by training the sample phrase; and 3) a second obtaining unit 406, configured to obtain recognized target text data output by the recognition model and corresponding to the text data.

Optionally, in one embodiment, the text recognition apparatus may be applied but is not limited to a recognition process of a voice text and a character text, for example, applied to a process in which collected voices are recognized to characters, or applied to a process in which an obtained character text is precisely recognized. The foregoing is merely exemplary, and an application scenario is not limited in this embodiment.

It should be noted that, obtained to-be-recognized text data is input to a recognition model, the recognition model being generated according to model parameters respectively obtained by a plurality of training nodes by performing training, each training node being used for obtaining a model parameter according to an obtained recognition coefficient of a sample phrase, to obtain recognized target text data output by the recognition model and corresponding to the text data. That is, according to the recognition model used for recognizing the to-be-recognized text data to obtain the target text data, a training process is distributed to each training node for performing, and the samples used for training are no longer concentrated on limited resource devices. In this way, a problem of memory overflow and training interruption caused by limited operation resources and memory resources in a related model training process is avoided. This reduces memory load and improves model training accuracy. Further, accuracy of text recognition is improved by using the foregoing the recognition model to perform the text recognition.

Optionally, in one embodiment, the method further includes a third obtaining unit, configured to: before the obtaining to-be-recognized text data, obtain sample text data, the sample text data including a plurality of sample phrases, and the sample phrases may be obtained by performing text segmentation; and a generation unit, configured to generate the recognition model by using the sample phrases, each model parameter for generating the recognition model being obtained according to the following recognition coefficients: a syntax probability and a back-off coefficient of each sample phrase. In one embodiment, the sample text data includes a plurality of sample phrases. The plurality of training nodes may be but is not limited to nodes in a Hadoop distributed system. Each training node performs training to obtain the model parameters for generating the recognition model.

Optionally, in one embodiment, each sample phrase may include but is not limited to one or more words. Each word is a phrase having an independent meaning. For example, a sample phrase on which word segmentation is performed is "<s> we go to play ball </s>". The sample phrase includes five words: "<s>", "we", "go to", "play ball", and "</s>". <s> is a start identifier, and </s> is an end identifier.

It should be noted that, the sample text data in one embodiment may be but is not limited to N-Gram data obtained by performing a round of MapReduce operation (a first round of MapReduce operation) on original sample data (for example, collected original corpuses). The N-Gram data includes a plurality of sample phrases on which word segmentation is performed. The example of "we go to play ball" is further used. The N-Gram data on which word segmentation is performed (the sample text data including a plurality of sample phrases) includes: "<s>", "<s> we", "<s> we go to", "<s> we go to play ball", "we", "we go to", "we go to play ball", "we go to play ball </s>", "go to", "go to play ball", "go to play ball </s>", "play ball", "play ball </s>", and "</s>".

In addition, in one embodiment, according to a quantity of words, the sample phrases in the sample text data may be divided according to orders. Each order is used for indicating a quantity of words in one sample phrase. The example of "we go to play ball" is further used. The corresponding N-Gram data includes first-order sample phrases: "<s>", "we", "go to", "play ball", and "</s>"; second-order sample phrases: "<s> we", "we go to", "go to play ball", and "play ball </s>"; third-order sample phrases: "<s> we go to", "we go to play ball", and "go to play ball </s>"; fourth-order sample phrases: "<s> we go to play ball" and "we go to play ball </s>".

Optionally, in one embodiment, another round of MapReduce operation (a second round of MapReduce operation) is performed on the sample text data, to obtain a word frequency and a syntax coefficient of each sample phrase in the sample text data. The syntax coefficient is used for obtaining a recognition coefficient and a syntax probability corresponding to the sample phrase according to the word frequency.

Optionally, in one embodiment, the model parameter may be obtained according to but is not limited to a recognition coefficient of a sample phrase and obtained by each training node. The recognition coefficient may include but is not limited to a syntax probability and a back-off coefficient of the sample phrase. It should be noted that, in one embodiment, the syntax probability may be obtained according to but is not limited to a sample probability by which the sample phrase appears on a corresponding training node and/or the syntax coefficient.

Optionally, in one embodiment, the generating the recognition model by using the sample phrases includes: distributing the sample phrases in the sample text data to the plurality of training nodes according to a predecessor word of each sample phrase, the predecessor word of the sample phrase being a previous word of a current word in the sample phrase, the current word being a last word in the sample phrase, and each word being a phrase having an independent meaning; obtaining the model parameters respectively obtained by the plurality of training nodes by training the received sample phrases; and combining the model parameters to generate the recognition model.

That is, the sample phrases in the sample text data (that is, the N-Gram data) are distributed to the plurality of training nodes with reference to the predecessor words of the sample phrases, so that the sample phrases respectively received by the plurality of training nodes are respectively trained by the plurality of training nodes, to obtain the model parameters for generating the recognition model (a third round of MapReduce operation). It should be noted that, in one embodiment, the sample phrases obtained by each training node may include but are not limited to sample phrases belonging to different orders.

For example, using a training node B as an example, "we" is used as an example of a corresponding predecessor word. Sample phrase whose predecessor words are "we" in the sample text data (that is, the N-Gram data) are distributed to the training node B. For example, the example of "we go to play ball" is further used. Sample data obtained by the training node B includes: "we go to" and "<s> we go to".

The training node B may but is not limited to training the received sample phrases according to orders, to obtain a recognition coefficient corresponding to each sample phrase. In this way, model parameters of the training node B are obtained according to the recognition coefficients of the sample phrases belonging to different orders on the training node B.

When training the sample phrases belonging to different orders, the training node may perform training by but is not limited to by means of data smoothing. It should be noted that, data smoothing is used for resolving a problem of data sparseness that is caused due to that many proper collocation relationships between words do not occur in the sample text data, also referred to as a problem of zero probability. On one hand, this manner can ensure that none of probabilities in the recognition model is zero. On the other hand, this manner enables probabilities of the recognition model parameters to be more evenly distributed, that is, a low probability (including a zero probability) is lifted up, and a high probability is lowered down. There are many types of data smoothing algorithms herein, including Good-Turing smoothing, Katz smoothing, Back-off smoothing, linear interpolation smoothing, Witten-Bell smoothing, and the like. In one embodiment, the Katz algorithm is used as an example for description, and details are not described again below.

That is, each training node trains the obtained sample phrases by means of data smoothing, to obtain the recognition coefficients of each sample phrase: the syntax probability and the back-off coefficient, and further obtains the model parameters of the training node by using the recognition coefficients of each the sample phrase, so that the recognition model used in a text recognition process is generated by combining the model parameters of each training node.

In exemplary embodiments provided in this application, according to the recognition model used for recognizing the to-be-recognized text data to obtain the target text data, a training process is distributed to each training node for performing, and the samples used for training are no longer concentrated on limited resource devices. In this way, a problem of memory overflow and training interruption caused by limited operation resources and memory resources in a related model training process is avoided. This reduces memory load and improves model training accuracy. Further, accuracy of text recognition is improved by using the foregoing recognition model to perform the text recognition.

In an optional solution, the generation unit includes:

1) a first distribution module, configured to distribute the sample phrases in the sample text data to the plurality of training nodes according to a predecessor word of each sample phrase, the predecessor word of the sample phrase being a previous word of a current word in the sample phrase, the current word being a last word in the sample phrase, and each word being a phrase having an independent meaning;

2) an obtaining module, configured to obtain the model parameters respectively obtained by the plurality of training nodes by training the received sample phrases; and 3) a combination module, configured to combine the model parameters to generate the recognition model.

It should be noted that, in one embodiment, the first distribution module includes:

(1) a first distribution submodule, configured to respectively distribute sample phrases whose orders are a first order in the sample text data to the plurality of training nodes; and (2) a second distribution submodule, configured to respectively distribute sample phrases whose orders are greater than or equal to a second order in the sample text data to the plurality of training nodes according to predecessor words of the sample phrases;

each order being used for indicating a quantity of words in one sample phrase.

That is, the sample phrases whose orders are a first order are respectively distributed to the training nodes. Because calculation amount of the first-order sample phrases is not large, training efficiency on each training node is not affected. In addition, the sample phrases whose orders are greater than or equal to a second order are respectively distributed to different training nodes according to predecessor words. The training nodes respectively receive the sample phrases distributed with reference to a predecessor word. The sample phrases include sample phrases belonging to different orders. The predecessor words of the sample phrases are used as a reference for distribution herein. This ensures that each training node includes all statistics required for all training.

Optionally, in one embodiment, when distributing the sample phrases in the sample text data to the plurality of training nodes, syntax coefficients corresponding to the sample phrases are distributed to a corresponding training node. Each syntax coefficient (also referred to as a discount rate, where details are not described again below) in one embodiment is used for obtaining a syntax probability (also referred to as a smoothing probability) corresponding to each sample phrase in the recognition coefficients. It should be noted that, the syntax coefficient herein and the sample phrase may be synchronously sent to the corresponding training node, or may be asynchronously sent. Different distribution manners may be applied according to different scenario requirements. This is not limited in this embodiment. In addition, the syntax coefficient herein may be but is not limited to being obtained according to the word frequency of the sample phrase before being distributed and after the second round of MapReduce operation is performed.

Optionally, in one embodiment, after receiving the distributed sample phrase and the corresponding syntax coefficient, each training node performs corresponding data training (that is, data smoothing processing). The data training process herein may be but is not limited to being performed by using a prefix tree (for example, a Trie tree). Using an example in which the text recognition method is applied to a Hadoop system, a sample probability by which each sample phrase on the training node appears on the training node is obtained by using a data structure of a Trie tree. The data structure of the Trie tree may include but is not limited to each tree node in the Trie tree.

For example, a Trie tree having a mapping relationship with words in a sample phrase is created according to a sequence of the words. The Trie tree is shown in FIG. 3. Each subnode is used for recording a word and a corresponding word frequency in the sample phrase. A word $w_i$ recorded by a subnode is a word following a word $w_{i-1}$ recorded by a root node adjacent to the subnode in the sample phrase. For example, each word in a sample phrase is searched for according to indication of shadow.

Further, a sample probability of a sample phrase is obtained according to a word frequency of a word recorded by each tree node in the Trie tree. For example, using an example in which the sample phrase is $w_1w_2 \ldots w_i$, a ratio of a word frequency that is of the sample phrase whose current word is $w_i$ and that is recorded in the Trie tree to a word frequency that is of a current word $w_{i-1}$ and that is recorded in the Trie tree may be used as a sample probability of the sample phrase $w_1w_2 \ldots w_i$. The word frequency of the current word $w_{i-1}$ may be but is not limited to being obtained by performing summation on subordinate subnodes of $w_{i-1}$. That is, a word frequency on a neighboring root node (for example, an $(i-1)^{th}$ order) may be determined by using a sum of word frequencies recorded on subnodes (for example, an $i^{th}$ order) in the Trie tree. This ensures accuracy of the obtained sample probability.

Optionally, in one embodiment, the combination module includes: a combination submodule, configured to combine, according to orders of the sample phrases, the model parameters obtained by the plurality of training nodes by performing training, to generate the recognition model.

In exemplary embodiments provided in this application, by distributing the sample phrases to different training nodes according to the predecessor words of the sample phrases for performing training, training efficiency can be improved, and all statistics required for all training can be ensured to be included on the training nodes. This ensures data independence and integrity.

In an optional solution, the following is further included:

1) a processing module, configured to: when distributing the sample phrases in the sample text data to the plurality of training nodes, repeatedly perform the following steps according to orders of the sample phrases in the sample text data till all orders in the sample text data are traversed, each order being used for indicating a quantity of words in one sample phrase, and each order including one or more sample phrases: obtaining a word frequency of a current sample phrase in a current order which the current sample phrase belongs to; obtaining a syntax coefficient corresponding to the current sample phrase according to the word frequency, the syntax coefficient being used for obtaining a syntax probability of the current sample phrase; determining whether the current sample phrase is a last sample phrase in the current order; if the current sample phrase is not the last sample phrase in the current order, obtaining a sample phrase following the current sample phrase in the current order to use as the current sample phrase; or if the current sample phrase is the last sample phrase in the current order, obtaining an order following the current order to use as the current order, and obtaining a sample phrase in the order following the current order to use as the current sample phrase, and 2) a second distribution module, configured to distribute the syntax coefficient to a corresponding training node in the plurality of training nodes according to the corresponding current sample phrase.

Details are described with reference to the following example. After the N-Gram data, that is, the sample text data is obtained, the second round of MapReduce operation is performed on the N-Gram data according to orders, to obtain a word frequency r and a corresponding syntax coefficient $d_r$ of each sample phrase in the N-Gram data.

For example, In an optional implementation, a calculation formula of the syntax coefficient $d_r$ may be as follows:

$$d_r = \frac{\frac{r^*}{r} - \frac{(k+1)n_{k+1}}{n_1}}{1 - \frac{(k+1)n_{k+1}}{n_1}} \quad (5)$$

$d_r$ is used for representing the syntax coefficient, r is used for representing the word frequency of the sample phrase in the order, $n_i$ is used for representing a quantity of sample phrases whose word frequencies are i times in the order, k is used for representing a predetermined coefficient, and $$r^* = (r+1)\frac{n_{r+1}}{n_r}.$$

That is, the sample phrases in the N-Gram data are traversed to perform the MapReduce operation, thereby obtaining the word frequency and the corresponding syntax coefficient of each sample phrase.

In exemplary embodiments provided in this application, corresponding syntax coefficients are obtained and distributed when the sample phrases in the sample text data are distributed to the plurality of training nodes. This reduces training time and improves training efficiency and generation efficiency of the recognition model. Further, accuracy of the generated recognition model is ensured, thereby improving accuracy of recognizing text data by using the recognition model.

In an optional solution, the obtaining module includes:

1) a mapping submodule, configured to respectively map the sample data (e.g., sample phrases) received by each of the plurality of training nodes to a prefix tree corresponding to the training node, the prefix tree being used for indicating a ranking relationship of words in each sample phrase received by the corresponding training node, each training node performing the following steps according to a corresponding prefix tree:

S1: Obtain a sample probability of a sample phrase according to the prefix tree, the sample probability being used for indicating a probability by which the sample phrase appears on the training node.

S2: Obtain a syntax probability of the sample phrase according to the sample probability of the sample phrase and/or a syntax coefficient corresponding to the sample phrase.

S3: Obtain a back-off coefficient of the sample phrase according to the syntax probability of the sample phrase, to obtain a model parameter of the training node.

Optionally, in one embodiment, the obtaining a syntax probability of the sample phrase according to the sample probability of the sample phrase and/or a syntax coefficient corresponding to the sample phrase includes:

S1: Repeatedly perform the following steps according to orders of the sample phrases on the training nodes till all orders on the training nodes are traversed.

S12: Obtain a syntax probability of a sample phrase whose order is n according to the following formula:

$$P(w_n | w_1 \ldots w_{n-1}) = \begin{cases} \frac{C(w_1 \ldots w_n)}{C(w_1 \ldots w_{n-1})}, & r > k \\ d_r \frac{C(w_1 \ldots w_n)}{C(w_1 \ldots w_{n-1})}, & 0 < r \le k \end{cases} \quad (6)$$

$P(w_n | w_1 \ldots w_{n-1})$ is used for representing a syntax probability of a sample phrase whose first (n−1) words are $w_1 \ldots w_{n-1}$ and a current word is $w_n$ in sample phrases whose orders are n, k is a predetermined parameter, r is used for representing a word frequency of the sample phrase whose first (n−1) words are $w_1 \ldots w_{n-1}$ and a current word is $w_n$ in the order, $d_r$ is used for representing a syntax coefficient corresponding to the sample phrase whose first (n−1) words are $w_1 \ldots w_{n-1}$ and a current word is $w_n$, and $$\frac{C(w_1 \ldots w_n)}{C(w_1 \ldots w_{n-1})}$$

is used for representing a sample probability of the sample phrase whose first (n−1) words are $w_1 \ldots w_{n-1}$ and a current word is $w_n$.

Optionally, in one embodiment, the obtaining a back-off coefficient of the sample phrase according to the syntax probability of the sample phrase includes:

$$\alpha_{w_1 \ldots w_{n-1}} = \frac{1 - \sum_{w_i : c(w_1 \ldots w_{n-1} w_i) > 0} p(w_i | w_1 \ldots w_{n-1})}{1 - \sum_{w_i : c(w_1 \ldots w_{n-1} w_i) > 0} p(w_i | w_2 \ldots w_{n-1})} \quad (7)$$

$\alpha_{w_1 \ldots w_{n-1}}$ is used for representing a back-off coefficient of the sample phrase whose first (n−1) words are $$\sum_{w_1 \ldots w_{n-1}, w_i : c(w_1 \ldots w_{n-1} w_i) > 0} p(w_i | w_1 \ldots w_{n-1})$$

is used for representing obtaining, in the sample phrases whose orders are n, a sum of syntax probabilities of sample phrases whose first (n−1) words are $w_1 \ldots w_{n-1}$ and current words are $w_i$ when word frequencies of the sample phrases whose first (n−1) words are $w_1 \ldots w_{n-1}$ and current words are $w_i$ are greater than 0, $$\sum_{w_i : c(w_1 \ldots w_{n-1} w_i) > 0} p(w_i | w_2 \ldots w_{n-1})$$

is used for representing obtaining, in the sample phrases whose orders are n, a sum of syntax probabilities of sample phrases whose first (n−2) words are $w_2 \ldots w_{n-1}$ and current words are $w_i$ when word frequencies of the sample phrases whose first (n−2) words are $w_2 \ldots w_{n-1}$ and current words are $w_i$ are greater than 0.

In exemplary embodiments provided in this application, when training the recognition model, a training process is distributed to each training node for performing, so that a problem of memory overflow caused by performing training by using a single machine is avoided. This reduces memory load of each training node and ensures accuracy of training performed by each training node, thereby improving training efficiency.

In an optional solution, the following is further included:

1) a third obtaining unit, configured to: before the obtaining recognized target text data output by the recognition model and corresponding to the text data, obtain, according to the recognition model, a recognition probability corresponding to each text phrase in the to-be-recognized text data, the text data including a plurality of text phrases; and 2) a determining unit, configured to determine, according to the recognition probability, the target text data output by the recognition model.

Optionally, in one embodiment, the third obtaining unit obtains the recognition probability by using the following formula:

$$P(w_m | w_1 \ldots w_{m-1}) = \begin{cases} P_{w_1 \ldots w_m}, & r > 0 \\ \alpha_{w_1 \ldots w_{m-1}} P_{w_2 \ldots w_m}, & r = 0 \end{cases} \quad (8)$$

$P(w_m|w_1 \ldots w_{m-1})$ is used for representing a recognition probability of a text phrase whose first (m−1) words are $w_1 \ldots w_{m-1}$ and a current word is $w_m$ in text phrases whose orders are m in text data, the current word being a last word in the text phrase, each word being a phrase having an independent meaning, and each order being used for indicating a quantity of words included in one text phrase, r is used for representing a word frequency of the text phrase whose first (m−1) words are $w_1 \ldots w_{m-1}$ and a current word is $w_m$ in the order, $P_{w_1 \ldots w_m}$ is used for representing a text probability of the text phrase whose first (m−1) words are $w_1 \ldots w_{m-1}$ and a current word is $w_m$, $\alpha_{w_1 \ldots w_{m-1}}$ is used for representing a back-off coefficient of the text phrase whose first (m−1) words are $w_1 \ldots w_{m-1}$, and $P_{w_2 \ldots w_m}$ is used for representing a text probability of a text phrase whose first (m−2) words are $w_2 \ldots w_{m-1}$ and a current word is $w_m$.

Optionally, in one embodiment, the determining unit includes:

1) a determining module, configured to: when the recognition probability is greater than a predetermined threshold, use a recognized phrase indicated by the recognition probability as a target phrase in the target text data.

Optionally, in one embodiment, the predetermined threshold may be set but is not limited to different values according to different scenarios. This is not limited in this embodiment.

In exemplary embodiments provided in this application, a recognition probability corresponding to each text phrase in the to-be-recognized text data is obtained according to the recognition model obtained through the foregoing training process. Further, when the recognition probability is greater than a predetermined threshold, a recognized phrase indicated by the recognition probability is used as a target phrase corresponding to the text phrase in the target text data.

For an application environment of some embodiments of this application, reference may be made but is not limited to the application environment of Embodiment 1. This is not described in detail in this embodiment. This embodiment of this application provides an optional and specific application example for performing the foregoing text recognition method.

Figure 5:
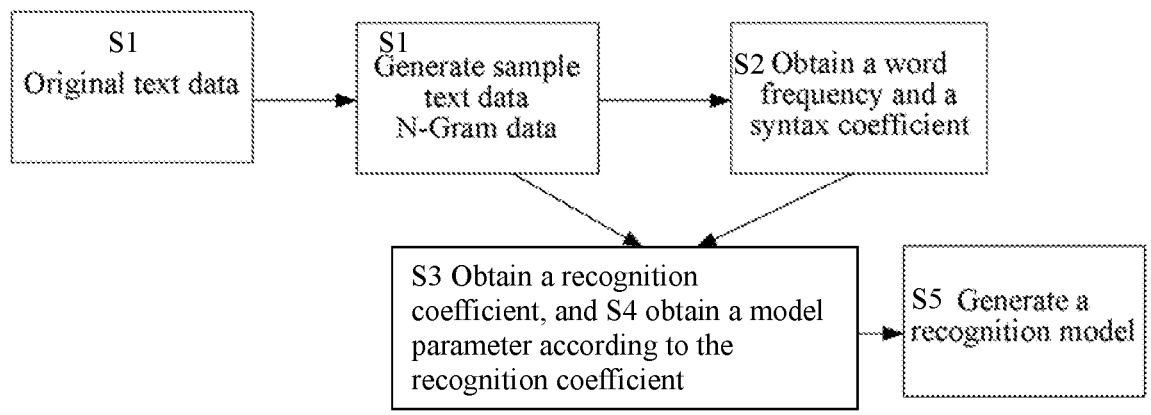
FIG. 5 is a schematic diagram of an optional text recognition method according to an embodiment of this application.

In an optional embodiment, the text recognition method may be applied but is not limited to a voice recognition process. A MapReduce operation is performed for a plurality of times in a training procedure, including N-Gram data generation, smoothing coefficient (that is, syntax coefficient, also referred to as discount rate) estimation, data distribution and model parameter (that is, syntax probability and back-off coefficient) estimation, and model parameter combination. Details about training steps are described with reference to FIG. 5:

S1: Collate original text data, perform word segmentation and generate N-Gram data (that is, sample text data), and obtain a word frequency of a sample phrase in the sample text data.

S2: Calculate a syntax coefficient (that is, a discount rate) of each sample phrase in each order according to the order, and abstract a first-order sample phrase.

S3: Distribute the N-Gram data in a division manner, and input the first-order sample phrase having the foregoing syntax coefficient (that is, the discount rate), the divided parts are respectively trained on training nodes, to estimate model parameters, that is, recognition coefficients of the sample phrase: a syntax probability and a back-off coefficient.

S4: Respectively count recognition coefficients of each sample phrase according to the orders, to obtain the model parameters of the training nodes.

S5: Combine the model parameters according to the orders, to obtain a final recognition model of an ARPA structure.

It should be noted that, in one embodiment, a Katz smoothing algorithm is used. Because first-order sample phrases have a relatively small quantity of information and probability calculation needs all first-order information, the sample phrases do not need to be divided, and can be trained alone.

Figure 6:
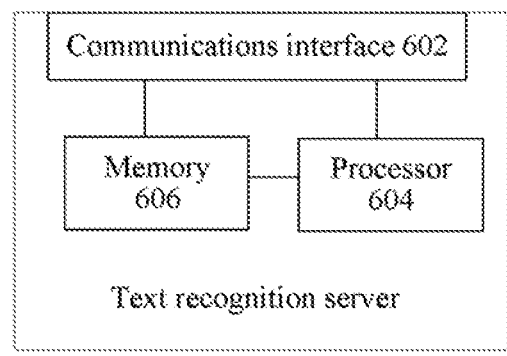
FIG. 6 is a schematic diagram of an optional text recognition server according to an embodiment of this application.

According to still another aspect of the embodiments of this application, a text recognition server for performing the foregoing text recognition method is further provided. As shown in FIG. 6, the server includes:

1) a communications interface 602, configured to obtain to-be-recognized text data;

2) a processor 604, connected to the communications interface 602 and configured to input the text data to a recognition model, the recognition model being generated according to model parameters respectively obtained by a plurality of training nodes by performing training, each training node being used for obtaining a model parameter according to an obtained recognition coefficient of a sample phrase, and the recognition coefficient being obtained by the training node by training the sample phrase;

the communications interface 602 being further configured to obtain recognized target text data output by the recognition model and corresponding to the text data; and 3) a memory 606, connected to the communications interface 602 and the processor 604 and configured to store the recognition model and the text data.

Optionally, for a specific example in one embodiment, refer to the examples described in Embodiment 1 and Embodiment 2. This is not described in detail in this embodiment.

According to still another aspect of the embodiments of this application, a storage medium is further provided. Optionally, in one embodiment, the storage medium may be located in at least one of a plurality of network devices in a network.

Optionally, in one embodiment, the storage medium is configured to store program code for performing the following steps:

S1: Obtain to-be-recognized text data.

S2: Input the text data to a recognition model, the recognition model being generated according to model parameters respectively obtained by a plurality of training nodes by performing training, each training node being used for obtaining a model parameter according to an obtained recognition coefficient of a sample phrase, and the recognition coefficient being obtained by the training node by training the sample phrase.

S3: Obtain recognized target text data output by the recognition model and corresponding to the text data.

Optionally, the storage medium is further configured to store program code for performing the following steps:

S1: Obtain sample text data, the sample text data including a plurality of sample phrases.

S2: Generate the recognition model by using the sample phrases, each model parameter for generating the recognition model being obtained according to the following recognition coefficients: a syntax probability and a back-off coefficient of each sample phrase.

Optionally, in one embodiment, the foregoing storage medium may include but is not limited to: any medium that can store program code, such as a USB flash drive, a ROM, a RAM, a removable hard disk, a magnetic disk, or an optical disc.

Optionally, for a specific example in one embodiment, refer to the examples described in Embodiment 1 and Embodiment 2. This is not described in detail in this embodiment.

The sequence numbers of the preceding embodiments of this application are merely for description but do not indicate the preference of the embodiments.

When being implemented in a form of a software functional unit and sold or used as an independent product, the integrated unit in the foregoing embodiments may be stored in the foregoing computer-readable storage medium. Based on such an understanding, the technical solutions of this application essentially, or the part contributing to the related technology, or all or some of the technical solutions may be implemented in a form of a software product. The computer software product is stored in a storage medium and includes several instructions for instructing one or more computer devices (which may be a PC, a server, a network device, and the like) to perform all or some of the steps of the methods in the embodiments of this application.

In the foregoing embodiments of this application, the description of each embodiment has respective focuses, and for the part that is not detailed in an embodiment, reference may be made to the relevant description of other embodiments.

In the several embodiments provided in this application, it should be understood that the disclosed client may be implemented in other manners. For example, the described apparatus embodiment is merely exemplary. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the units or modules may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

The foregoing descriptions are merely optional implementations of this application. It should be noted that a person of ordinary skill in the art may make improvements and polishing without departing from the principle of this application, and these all fall within the protection scope of this application.

According to the embodiments of this application, obtained to-be-recognized text data is input to a recognition model, the recognition model being generated according to model parameters respectively obtained by a plurality of training nodes by performing training, each training node being used for obtaining a model parameter according to an obtained recognition coefficient of a sample phrase, to obtain recognized target text data output by the recognition model and corresponding to the text data. According to the recognition model, a training process is distributed to each training node for performing, and the samples used for training are no longer concentrated on limited resource devices. In this way, a problem of memory overflow and training interruption caused by limited operation resources and memory resources in a related model training process is avoided. This reduces memory load and improves model training accuracy. Further, accuracy of text recognition is improved by using the foregoing the recognition model to perform the text recognition.

What is claimed is:

1. A text recognition method, comprising:
obtaining, by a first server, sample text data, the sample text data comprising a plurality of sample phrases;
generating a recognition model based on the sample phrases by performing training on a plurality of training nodes, each training node being a server connected to the first server, comprising:
distributing, by the first server, the sample phrases to the plurality of training node according to a predecessor word of each sample phrase, the predecessor word of the sample phrase being a previous word of a current word in the sample phrase, the current word being a last word in the sample phrase, and each word being a phrase having an independent meaning, wherein sample phrases with the same predecessor word are distributed to a same training node;
distributing, by the first server, for each sample phrase, a corresponding syntax coefficient to a training node which the sample phrase is distributed to by traversing all orders in the sample text data, the syntax coefficient being obtained by the first server according to a word frequency of the sample phrase in an order which the sample phrase belongs to, wherein an order indicates quantity of words in one sample phrase, and the sample text data comprises one or more sample phrases belonging to each order;
after being distributed with the sample phrases and corresponding syntax coefficients, respectively obtaining, by each of the plurality of training nodes independently in parallel, recognition coefficients of the sample phrases distributed to the corresponding training node, the recognition coefficients comprising: both a syntax probability and a back-off coefficient of each sample phrase, the syntax probability being obtained according to: a sample probability of a sample phrase when a word frequency of the sample phrase is greater than a predetermined parameter, and the syntax coefficient and the sample probability when the word frequency is less than or equal to the predetermined parameter;

determining, by each of the plurality of training nodes independently in parallel, model parameters of the recognition model according to the recognition coefficients of the sample phrases; and combining the model parameters from the plurality of training nodes to generate the recognition model;

obtaining, by a second server, to-be-recognized text data;

inputting, by the second server, the to-be-recognized text data to the recognition model; and obtaining recognized target text data output by the recognition model and corresponding to the to-be-recognized text data.

2. The method according to claim 1, wherein the distributing the sample phrases in the sample text data to the plurality of training nodes comprises:

respectively distributing sample phrases consisting of one word in the sample text data to the plurality of training nodes; and respectively distributing sample phrases consisting of two or more words in the sample text data to the plurality of training nodes according to predecessor words of the sample phrases.

3. The method according to claim 1, wherein when distributing the sample phrases in the sample text data to the plurality of training nodes, the method further comprises:

repeatedly performing the following steps according to the orders of the sample phrases in the sample text data till all orders in the sample text data are traversed:

obtaining the word frequency of a current sample phrase in a current order which the current sample phrase belongs to;

obtaining the syntax coefficient corresponding to the current sample phrase according to the word frequency, the syntax coefficient being used for obtaining the syntax probability of the current sample phrase;

determining whether the current sample phrase is a last sample phrase in the current order;

if the current sample phrase is not the last sample phrase in the current order, obtaining a sample phrase following the current sample phrase in the current order to use as the current sample phrase; and if the current sample phrase is the last sample phrase in the current order, obtaining an order following the current order to use as the current order, and obtaining a sample phrase in the order following the current order to use as the current sample phrase, and distributing the syntax coefficient to a corresponding training node in the plurality of training nodes according to the corresponding current sample phrase.

4. The method according to claim 1, wherein the obtaining the model parameters respectively obtained by the plurality of training nodes by training the received sample phrases comprises:

respectively mapping the sample phrases received by each of the plurality of training nodes to a prefix tree corresponding to the training node, the prefix tree indicating a ranking relationship of words in each sample phrase received by the corresponding training node, each training node performing the following steps according to the corresponding prefix tree:

obtaining the sample probability of the sample phrase according to the prefix tree, the sample probability indicating a probability by which the sample phrase appears on the training node;

obtaining the syntax probability of the sample phrase according to the sample probability of the sample phrase and/or the syntax coefficient corresponding to the sample phrase; and obtaining the back-off coefficient of the sample phrase according to the syntax probability of the sample phrase, to obtain a model parameter of the training node.

5. The method according to claim 1, wherein the combining the model parameters to generate the recognition model comprises:

combining, according to orders of the sample phrases, the model parameters obtained by the plurality of training nodes, to generate the recognition model.

6. The method according to claim 1, wherein before the obtaining recognized target text data output by the recognition model and corresponding to the to-be-recognized text data, the method further comprises:

obtaining, according to the recognition model, a recognition probability corresponding to each text phrase in the to-be-recognized text data, the to-be-recognized text data comprising a plurality of text phrases; and determining, according to the recognition probability, the target text data output by the recognition model.

7. The method according to claim 6, wherein the determining, according to the recognition probability, the target text data output by the recognition model comprises:

when the recognition probability is greater than a predetermined threshold, using a recognized phrase indicated by the recognition probability as a target phrase in the target text data.

8. The method according to claim 1, further comprising: distributing syntax coefficients of the sample phrases to the plurality of training nodes asynchronously.

9. The method according to claim 1, wherein the syntax coefficient of a sample phrase is obtained, before being distributed to the training node and after a MapReduce operation is performed on the sample text data, according to: the word frequency of the sample phrase in a corresponding order of N-gram data obtained from the sample text data.

10. The method according to claim 1, wherein the syntax probability of a sample phrase whose order is n is obtained according to the following formula:

$$P(w_n | w_1 \ldots w_{n-1}) = \begin{cases} \dfrac{C(w_1 \ldots w_n)}{C(w_1 \ldots w_{n-1})}, & r > k \\ d_r \dfrac{C(w_1 \ldots w_n)}{C(w_1 \ldots w_{n-1})}, & 0 < r \le k \end{cases}$$

wherein $P(w_n | w_1 \ldots w_{n-1})$ represents the syntax probability of the sample phrase whose first (n−1) words are $w_1 \ldots w_{n-1}$ and a current word is $w_n$ in sample phrases whose orders are n, k is a predetermined parameter, r represents the word frequency of the sample phrase whose first (n−1) words are $w_1 \ldots w_{n-1}$ and a current word is $w_n$ in the order, $d_r$ represents the syntax coefficient corresponding to the sample phrase whose first (n−1) words are $w_1 \ldots w_{n-1}$ and a current word is $w_n$, and $$\frac{C(w_1 \ldots w_n)}{C(w_1 \ldots w_{n-1})}$$

represents the sample probability of the sample phrase whose first (n−1) words are $w_1 \ldots w_{n-1}$ and a current word is $w_n$.

11. A text recognition apparatus, comprising one or more processors and one or more memories, wherein the one or more processors are configured to:
   obtaining, by a first server, sample text data, the sample text data comprising a plurality of sample phrases;
   generating a recognition model based on the sample phrases by performing training on a plurality of training nodes, each training node being a server connected to the first server, comprising:
      distributing, by the first server, the sample phrases to the plurality of training node according to a predecessor word of each sample phrase, the predecessor word of the sample phrase being a previous word of a current word in the sample phrase, the current word being a last word in the sample phrase, and each word being a phrase having an independent meaning, wherein sample phrases with the same predecessor word are distributed to a same training node;
      distributing, by the first server, for each sample phrase, a corresponding syntax coefficient to a training node which the sample phrase is distributed to by traversing all orders in the sample text data, the syntax coefficient being obtained by the first server according to a word frequency of the sample phrase in an order which the sample phrase belongs to, wherein an order indicates quantity of words in one sample phrase, and the sample text data comprises one or more sample phrases belonging to each order;
      after being distributed with the sample phrases and corresponding syntax coefficients, respectively obtaining, by each of the plurality of training nodes independently in parallel, recognition coefficients of the sample phrases distributed to the corresponding training node, the recognition coefficients comprising: both a syntax probability and a back-off coefficient of each sample phrase, the syntax probability being obtained according to: a sample probability of a sample phrase when a word frequency of the sample phrase is greater than a predetermined parameter, and the syntax coefficient and the sample probability when the word frequency is less than or equal to the predetermined parameter;
      determining, by each of the plurality of training nodes independently in parallel, model parameters of the recognition model according to the recognition coefficients of the sample phrases; and
      combining the model parameters from the plurality of training nodes to generate the recognition model;
   obtain to-be-recognized text data;
   input the to-be-recognized text data to the recognition model; and
   obtain recognized target text data output by the recognition model and corresponding to the to-be-recognized text data.

12. The apparatus according to claim 11, wherein the one or more processors are further configured to:
   respectively distribute sample phrases consisting of one word in the sample text data to the plurality of training nodes; and
   respectively distribute sample phrases consisting of two or more words in the sample text data to the plurality of training nodes according to predecessor words of the sample phrases.

13. The apparatus according to claim 11, wherein the one or more processors are further configured to:
   when distributing the sample phrases in the sample text data to the plurality of training nodes, repeatedly perform the following steps according to the orders of the sample phrases in the sample text data till all orders in the sample text data are traversed:
      obtaining the word frequency of a current sample phrase in a current order which the current sample phrase belongs to;
      obtaining the syntax coefficient corresponding to the current sample phrase according to the word frequency, the syntax coefficient being used for obtaining the syntax probability of the current sample phrase;
      determining whether the current sample phrase is a last sample phrase in the current order;
      if the current sample phrase is not the last sample phrase in the current order, obtaining a sample phrase following the current sample phrase in the current order to use as the current sample phrase; and
      if the current sample phrase is the last sample phrase in the current order, obtaining an order following the current order to use as the current order, and obtaining a sample phrase in the order following the current order to use as the current sample phrase, and
   distribute the syntax coefficient to a corresponding training node in the plurality of training nodes according to the corresponding current sample phrase.

14. The apparatus according to claim 11, wherein the one or more processors are further configured to:
   respectively map the sample phrases received by each of the plurality of training nodes to a prefix tree corresponding to the training node, the prefix tree indicating a ranking relationship of words in each sample phrase received by the corresponding training node,
   each training node performing the following steps according to the corresponding prefix tree:
      obtaining the sample probability of the sample phrase according to the prefix tree, the sample probability being used for indicating a probability by which the sample phrase appears on the training node;
      obtaining the syntax probability of the sample phrase according to the sample probability of the sample phrase and/or the syntax coefficient corresponding to the sample phrase; and
      obtaining the back-off coefficient of the sample phrase according to the syntax probability of the sample phrase, to obtain a model parameter of the training node.

15. The apparatus according to claim 11, wherein the one or more processors are further configured to:
   combine, according to orders of the sample phrases, the model parameters obtained by the plurality of training nodes, to generate the recognition model.

16. The apparatus according to claim 11, wherein the one or more processors are further configured to:
   before the obtaining recognized target text data output by the recognition model and corresponding to the to-be-recognized text data, obtain, according to the recognition model, a recognition probability corresponding to each text phrase in the to-be-recognized text data, the to-be-recognized text data comprising a plurality of text phrases; and determine, according to the recognition probability, the target text data output by the recognition model.

17. The apparatus according to claim 16, wherein the one or more processors are further configured to:

when the recognition probability is greater than a predetermined threshold, use a recognized phrase indicated by the recognition probability as a target phrase in the target text data.

18. A non-transitory storage medium storing computer programs that, when being executed by one or more processors, cause the one or more processors to perform:

obtaining, by a first server, sample text data, the sample text data comprising a plurality of sample phrases;

generating a recognition model based on the sample phrases by performing training on a plurality of training nodes, each training node being a server connected to the first server, comprising:

distributing, by the first server, the sample phrases to the plurality of training node according to a predecessor word of each sample phrase, the predecessor word of the sample phrase being a previous word of a current word in the sample phrase, the current word being a last word in the sample phrase, and each word being a phrase having an independent meaning, wherein sample phrases with the same predecessor word are distributed to a same training node;

distributing, by the first server, for each sample phrase, a corresponding syntax coefficient to a training node which the sample phrase is distributed to by traversing all orders in the sample text data, the syntax coefficient being obtained by the first server according to a word frequency of the sample phrase in an order which the sample phrase belongs to, wherein an order indicates quantity of words in one sample phrase, and the sample text data comprises one or more sample phrases belonging to each order;

after being distributed with the sample phrases and corresponding syntax coefficients, respectively obtaining, by each of the plurality of training nodes independently in parallel, recognition coefficients of the sample phrases distributed to the corresponding training node, the recognition coefficients comprising: both a syntax probability and a back-off coefficient of each sample phrase, the syntax probability being obtained according to: a sample probability of a sample phrase when a word frequency of the sample phrase is greater than a predetermined parameter, and the syntax coefficient and the sample probability when the word frequency is less than or equal to the predetermined parameter;

determining, by each of the plurality of training nodes independently in parallel, model parameters of the recognition model according to the recognition coefficients of the sample phrases; and combining the model parameters from the plurality of training nodes to generate the recognition model;

obtaining to-be-recognized text data;

inputting the to-be-recognized text data to the recognition model; and obtaining recognized target text data output by the recognition model and corresponding to to-be-recognized the text data.

* * * * *